Feb. 4, 1964   L. ZUCH   3,120,076
COLLAPSIBLE TABLE-TOP SCREEN
Filed April 5, 1961   3 Sheets-Sheet 1
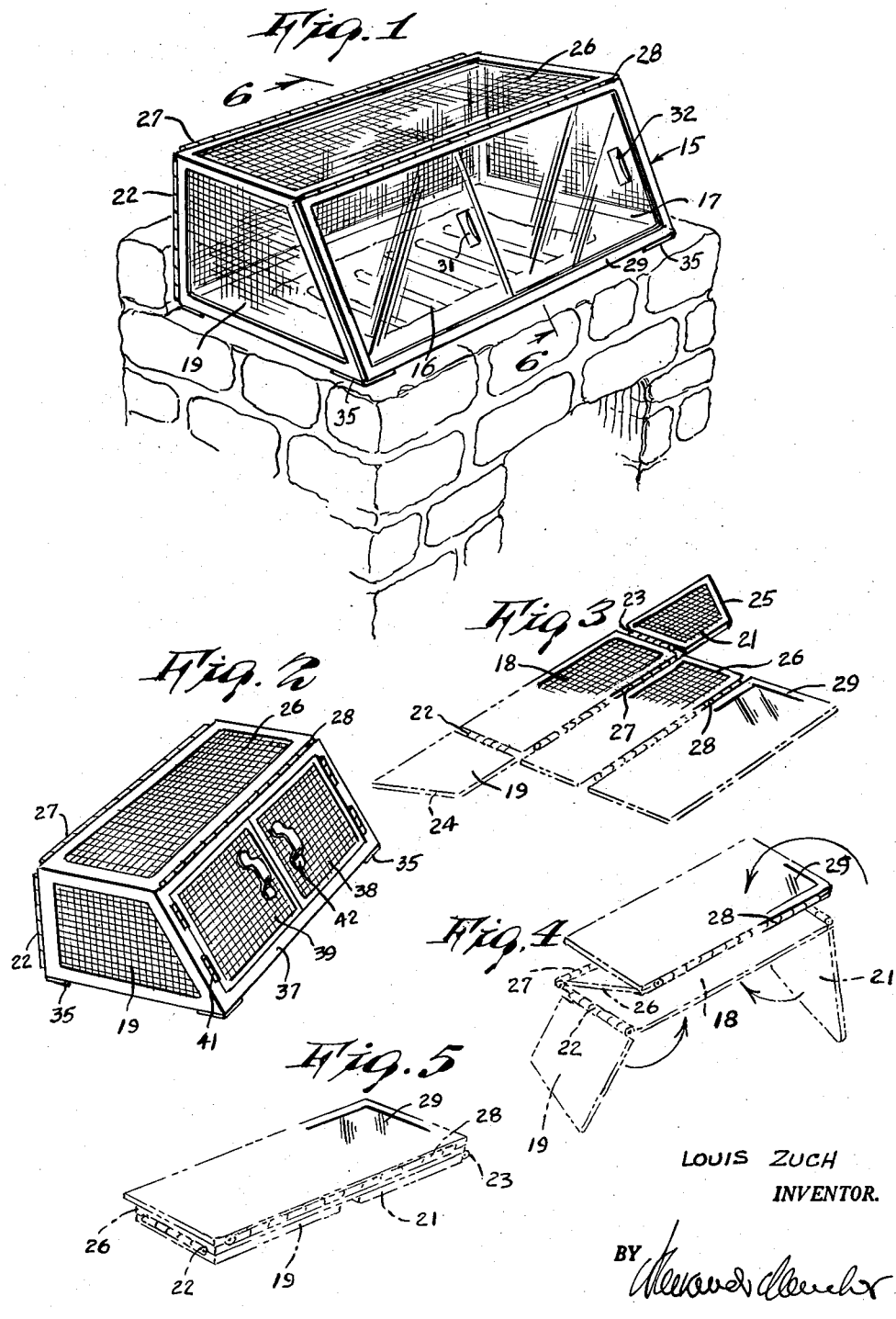
LOUIS ZUCH
INVENTOR.
BY
ATTORNEY

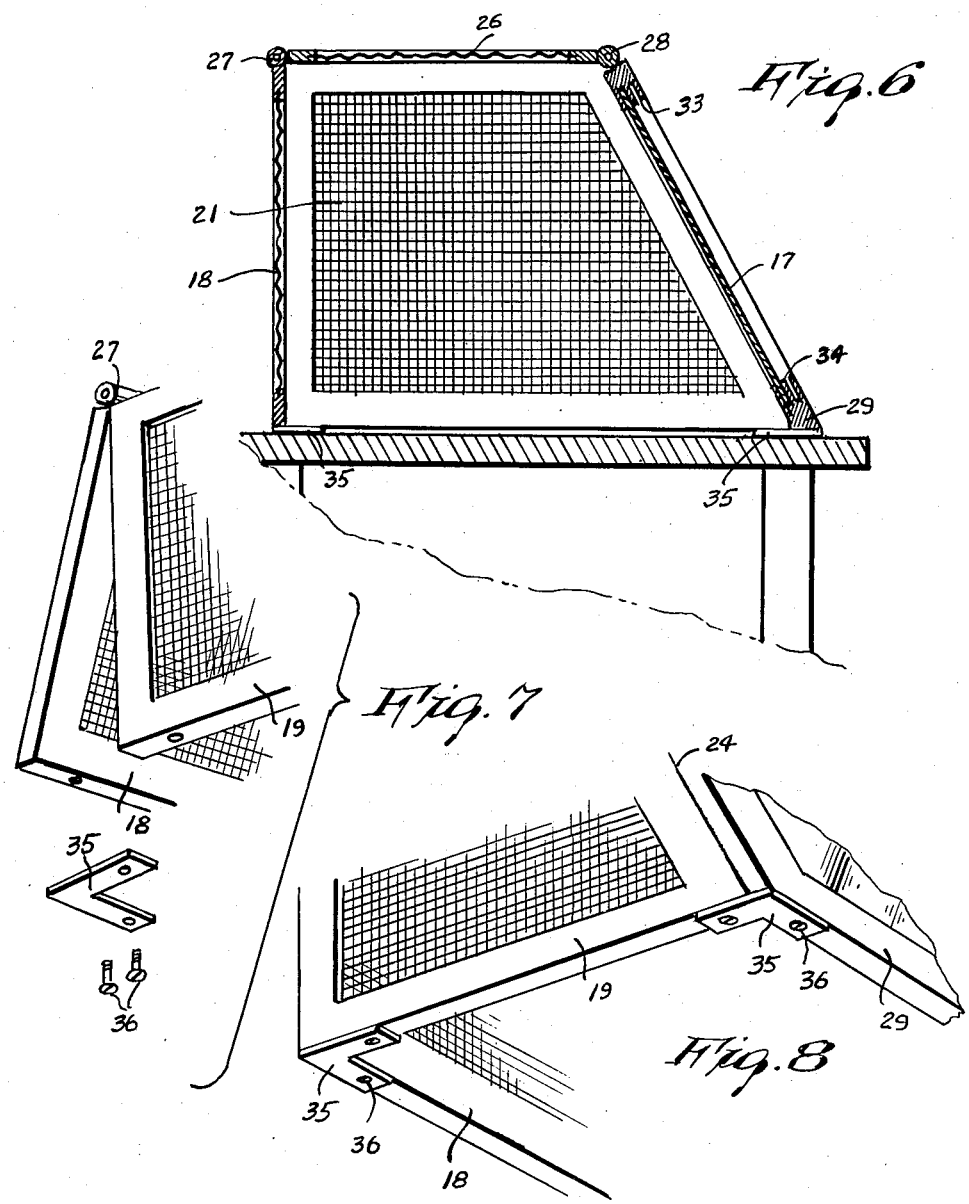

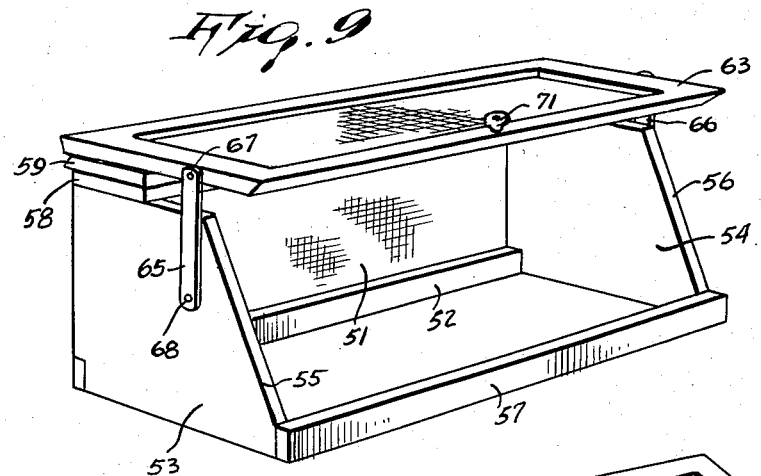
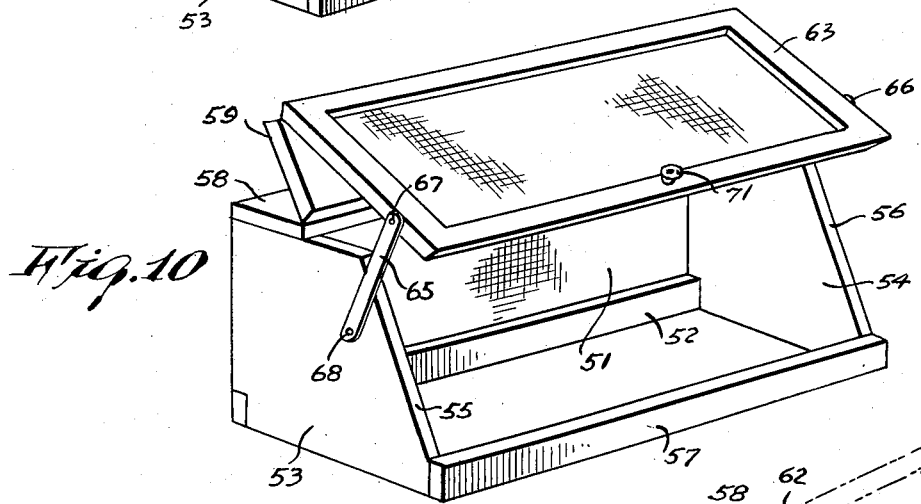
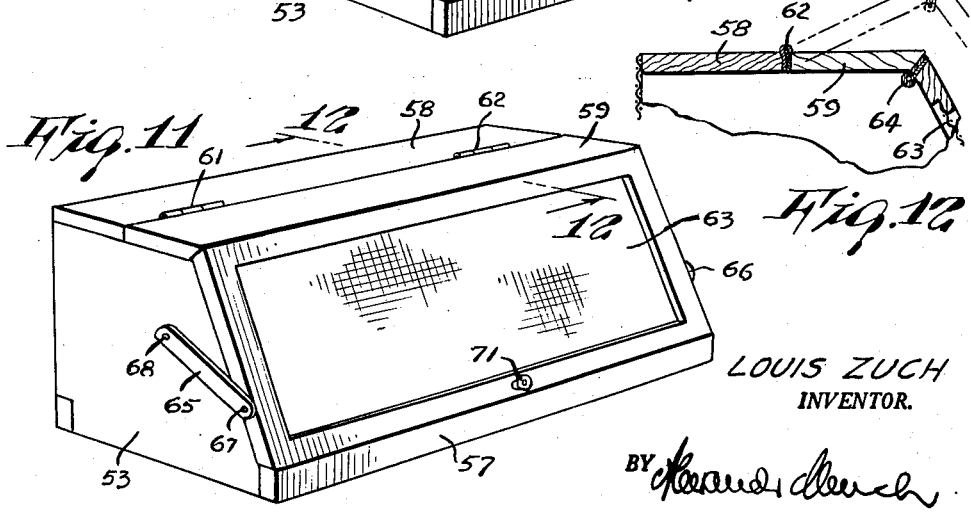

United States Patent Office 3,120,076
Patented Feb. 4, 1964

3,120,076
COLLAPSIBLE TABLE-TOP SCREEN
Louis Zuch, 8 Banbury Lane, Bloomfield, Conn.
Filed Apr. 5, 1961, Ser. No. 100,869
1 Claim. (Cl. 45—68)

This invention relates to a table-top screen enclosure to protect food and drink from insects, winds and unauthorized tampering.

It is the principal object of the present invention to provide a table-top screen enclosure which can be easily knocked down or collapsed when not in use to consume little storage space.

It is another object of the invention to provide a table-top screen enclosure in which the sides, rear, top and front door parts are all hinged together in one assembly and can be folded when they are collapsed from their overlying positions readily to their upright positions and secured together by simply fixing to the under edges of the parts corner foot plates and which can be detached therefrom by the removing of the screws to knock down the parts and allow them to be assembled over one another.

It is still another object of the invention to provide a table-top enclosure which will have a show case-type of front bearing doors that open either by sliding or outwardly so that ready and easy access is had into the enclosure for the placing of foods therein or removal of them therefrom.

It is a further object of the invention to provide a table-top enclosure that is open on the bottom so that the foods and drinks can be deposited upon the table surface and yet provide in cooperation with the table-top an enclosure for the bottom of the enclosure.

It is still a further object of the invention to provide a table-top screen enclosure in which the front door containing slide doors and the top part are hinged together and hinged to a rear part so that they can be folded together and hinged over upon and supported upon the rear part providing thereby a large access to the interior of the enclosure.

Other objects of the invention are to provide a table-top screen enclosure, having the above objects in mind, which is of simple construction, inexpensive to manufacture, has a minimum number of parts, easy to assemble and collapse, light in weight, easy to keep clean and sanitary, of pleasing appearance, efficient and effective in maintaining food sanitation, free of insects, winds and unauthorized tampering, durable, and compact.

For a better understanding of the invention reference may be had to the following detailed description taken in connection with the accompanying drawing, in which FIGURE 1 is a perspective view of a knocked down type of table-top enclosure resting on the top of an outdoor grille for protective purposes of the food being prepared on the grille, FIG. 2 is a perspective view of a knocked down type of table-top screen enclosure constructed with a slightly different front part, the doors being opened outwardly instead of slidable as shown in FIG. 1, FIG. 3 is a perspective view of the table-top screen enclosure of either of the forms shown in FIGS. 1 or 2 collapsed and spread out, FIG. 4 is an illustrative perspective view illustrating the maner in which the parts of the enclosure are hinged upon one another to collapse the enclosure, FIG. 5 is a perspective view of the enclosure with the parts fully collapsed upon one another and adapted to be stored, FIG. 6 is an enlarged vertical sectional view of the form of the invention shown in FIG. 1 as viewed on line 6—6 thereof, FIG. 7 is a collective and fragmentary view of one corner of the forms of the invention shown in FIGS. 1 and 2 and of the angle plate securing the parts together providing a foot piece, FIG. 8 is a bottom perspective view of the assembled enclosure, FIG. 9 is a perspective view of a still further form of table-top enclosure with the front door and top part hinged together and overlying a rear top part, FIG. 10 is a similar perspective view with the top in the process of being lowered and the door being guided to its closed position, FIG. 11 is a perspective view of the enclosure with the door top parts hinged downwardly in its closed position, and FIG. 12 is a fragmentary transverse sectional view of the enclosure shown in FIG. 11 and as viewed on line 12—12 thereof.

Referring now particularly to FIGS. 1, 3, 4, 5, 6, 7 and 8, 15 represents generally the table-top screen enclosure embodying slide front doors 16 and 17. This enclosure 15 has a rear screen part 18 to the opposite ends there are hinged side wing parts 19 and 21 by means of vertically-extending hinges 22 and 23. The rear part 18 is set upright to rest on its lower edge, side wing parts 19 and 21 are hinged forwardly and are provided respectively with inclined front edges 24 and 25.

Hinged to the upper edge of the rear part 18 is a top screen part 26. This is effected by a piano hinge 27. To the forward edge of the top part 26 and connected thereto by a piano hinge 28 is a front part 29 bearing the slide screens or transparent doors 16 and 17 having respective handles 31 and 32 indented therein. The front part 29 thus constitutes a frame which has sets of upper and lower grooves 33 and 34 in which the slide doors 16 and 17 can slide to overlie one another and to provide a one half opening at a time. The front part 29 overlies the inclined edges 24 and 25 of the side wing parts.

To secure the parts together to provide the finally assembled enclosure, angle plates 35 are fixed to the under edges at the corners thereof by means of screws 36 as best illustrated in FIGS. 7 and 8. These corner plates of angle shape serve when secured to the parts as supporting feet for the finally assembled closure. To disassemble the enclosure, the screws 36 and the plates 35 are removed and with all of the parts hinged together as above set forth, the front part 29 can be hinged upwardly upon the top part 26 as illustrated in FIG. 4 and the top part hinged downwardly upon the rear part or the rear part hinged upwardly against the top part and the wing or side parts 19 and 21 hinged inwardly under the rear part 18. A compact fully collapsed and knocked down view of the enclosure has been provided as seen in FIG. 5.

In FIG. 2 there is shown a similarly constructed table-top enclosure wherein a front part 37 is used which instead of having slide doors, are provided with outwardly hinged doors 38 and 39 connected by hinges 41 to the side edges of the front frame part 37 and which can be opened by the handles 42. In this manner with both doors 38 and 39 opened full access can be had to the interior of the enclosure. The side, rear and top part of the enclosures shown in FIG. 2 are identical with the similar parts of FIG. 1 and the angle foot plate 35 are provided to secure the parts thereof together. This enclosure shown in FIG. 2 is collapsed in the same manner as the enclosure 15 of FIG. 1 and as illustrated and above described with reference to FIGS. 4 and 5.

It will be noted in both of the forms of the invention shown in FIGS. 1 and 2 that the front and top parts can be hinged upon one another and that both of the parts can be hinged upon the rear part so that the full top of the enclosure as well as the front thereof can be opened up or swung back as desired if screws 36 are removed from the angle plates 35 lying under the front corners of the enclosure.

In the form of the invention shown in FIGS. 9, 10, 11 and 12, it will be noted that only a partial part of the top can be raised with the front part but this allows for a full resting of the front part upon the top parts. According to this latter form of the invention the parts forming the sides, rear and lower front of the enclosure are built up in solid form as a frame and are not collapsible upon one another. This form of the invention includes a rear part, consisting of a screen 51 and a bottom frame member 52 that is cut into and joined with side end parts 53 and 54 which have forwardly inclined edges 55 and 56, respectively that are joined by a front piece or member 57 that extends across the bottom front of the enclosure.

Fixed to the rear edge of the side walls 53 and 54 is a rear top part 58 to which a front top part 59 is hinged by hinges 61 and 62 and to which a front door or screen part 63 is hinged by a piano hinge 64, FIG. 12. The lower part of the screen door 63 is guided in its upper movement by side links 65 and 66 pivotally connected on the outer edges of the screen door part 63 by pivot pins 67 and to the side end parts by pivot pins 68. A handle or knob 71 is provided on the lower edge of the door frame part 63 and may be used to lift the door part from a closed position shown in FIG. 11 upwardly to elevated positions shown in FIGS. 9 and 10. The front screen door part 63 thereby swinging the front top part 59 rearwardly so that it can overlie the rear front part 58 in the manner shown in FIG. 9 and thus the full front and a part of the top is opened to provide easy access to the interior of the enclosure and the door part be maintained in an elevated position. Thus as in the first mentioned forms of the invention, the front door part is hinged upon the top part and can overlie the same to hold the front part elevated.

It should now be apparent that there has been provided a table-top screen enclosure in which use of the table top is made to close the bottom and so the food can lie on the grille as shown in FIG. 1 or upon a table top. In the forms of the invention shown in FIGS. 1 and 2, the parts are collapsible upon one another and can be readily assembled and disassembled for use or for storage. In the latter form of the invention the front screen door is movable upwardly with a top part, the door part being hinged along its top edge therewith so that other access can be had to the interior of the disclosure and the door part rested on the top when it is desired to leave the enclosure opened.

While various changes may be made in the detail construction, it shall be understood that such changes shall be within the spirit and scope of the present invention as defined by the appended claim.

What is claimed is:

A table-top screen enclosure comprising a rear part, side end and top parts, each of said parts having central and view-penetrable panels and a front part hinged to the forward edge of the top part, said side end parts having an inclined front edge, said front part overlying the inclined side edges upon being hinged downwardly from the top part to close the enclosure, and said front part having slide doors therein.

References Cited in the file of this patent

UNITED STATES PATENTS

| | | |
|---|---|---|
| 566,009 | Noble | Aug. 18, 1896 |
| 1,279,434 | Prichard | Sept. 17, 1918 |
| 1,986,077 | Spang | Jan. 1, 1935 |
| 2,126,112 | Holderle et al. | Aug. 9, 1938 |
| 2,276,375 | Derman | Mar. 17, 1942 |
| 2,355,541 | Lew | Aug. 8, 1944 |
| 2,563,078 | Silberman | Aug. 7, 1951 |

FOREIGN PATENTS

| | | |
|---|---|---|
| 604,344 | Great Britain | July 1, 1948 |